March 20, 1945.    T. L. WEYBREW    2,372,145
LOCOMOTIVE CONTROL SYSTEM
Filed Feb. 10, 1943
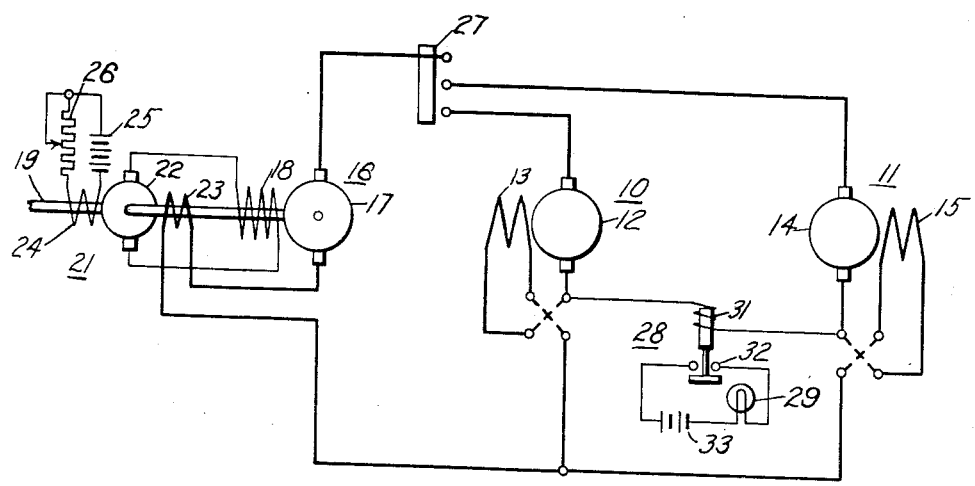
WITNESSES:
Alice L Howell
INVENTOR
Thelbert L. Weybrew.
BY
G M Crawford
ATTORNEY Patented Mar. 20, 1945

2,372,145

UNITED STATES PATENT OFFICE 2,372,145

LOCOMOTIVE CONTROL SYSTEM

Thelbert L. Weybrew, Edgewood, Pa., assignor to Westinghouse Electric & Manufacturing Company, East Pittsburgh, Pa., a corporation of Pennsylvania Application February 10, 1943, Serial No. 475,393

6 Claims. (Cl. 172—179)

My invention relates, generally, to control systems and, more particularly, to systems for controlling the operation of electrically-propelled locomotives.

In the past, self-propelled locomotives of the Diesel-electric type, as well as trolley locomotives, have usually been accelerated in part with at least two motors connected in series-circuit relation. Any slippage of the driving wheels during the series connection has been indicated by a relay connected across the midpoint between the series-connected motors and the midpoint of a resistor or a reactor connected across the motor armatures.

In order to improve the performance of locomotives of certain types and simplify their control, the motors have recently been connected in parallel-circuit relation during the entire accelerating period. However, the foregoing slip-indicating scheme cannot be utilized with parallel-connected motors.

An object of my invention, generally stated, is to simplify and improve the previously known slip-indicating schemes for electrically-propelled locomotives.

A more specific object of my invention is to provide a slip-indicating scheme which is suitable for use with parallel-connected motors.

Other objects of my invention will be explained fully hereinafter or will be apparent to those skilled in the art.

In accordance with my invention the actuating coil of a slip-indicating relay is so connected between the armature windings and the series field windings of two parallel-connected motors that the relay is responsive to any unbalance in the motor voltages caused by wheel slippage. The contact members of the relay are utilized to control the energization of a lamp or other indicating device.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a pair of traction motors 10 and 11 which may be of the series type suitable for propelling an electric locomotive or other vehicle. The motor 10 is provided with an armature winding 12 and a series field winding 13. The motor 11 is provided with an armature winding 14 and a series field winding 15.

The power for operating the motors may be supplied from a generator 16 having an armature winding 17 and a field winding 18. The excitation current for the field winding 18 may be supplied by an exciter 21 having an armature winding 22, a differential field winding 23 and a separately excited field winding 24. The field winding 24 may be energized from a battery 25. A variable resistor or rheostat 26 may be provided for controlling the excitation current for the field winding 24.

The differential field winding 23 is connected in series-circuit relation with the armature winding 17 of the generator 16 and is, therefore, energized by the generator load current, thereby giving the generator a drooping voltage characteristic. The exciter 21 and the generator 16 may be mounted on the same shaft 19 to be driven by a Diesel engine or other suitable prime mover in accordance with usual practice in self-propelled locomotives.

As explained hereinbefore, the motors 10 and 11 are connected to the generator 16 in parallel-circuit relation during operation of the locomotive. An suitable accelerating system may be employed, but since such system forms no part of my present invention it is not deemed necessary to illustrate or describe any such system. However, a controller 27 (shown in part) may be utilized for establishing the motor connections.

In order to provide a visual indication of any wheel slippage which may take place during operation of the locomotive and particularly during the accelerating period, a relay 28 and an indicating lamp 29 are provided. The relay 28 is provided with an actuating coil 31, one terminal of which is connected between the armature winding and the series field winding of the motor 10 and the other terminal of which is connected between the armature winding and the series field winding of the motor 11. When contact members 32 of the relay 28 are closed by the energization of the actuating coil 31, the lamp 29 is energized from a battery 33.

The resistances of the motor field windings 13 and 15 are practically the same, therefore, the voltage drop across the field windings will be the same so long as the motors operate without slipping and the motors are drawing the same current. If one of the axles slips, its motor will increase in speed, thereby causing a corresponding reduction in the current in its series field winding because of the increase of the motor counter-electromotive force.

Since both motors are supplied by the generator 16, which has a differential field exciter, the generator voltage has a tendency to rise with the decreased load, thereby increasing the current through the motor which is not slipping. The unbalance in the currents through the field windings creates an unbalance in the voltage drop across these windings, thereby causing a difference in the voltage of the two points to which the actuating coil 31 of the relay 28 is connected.

The voltage impressed on the relay coil increases as the speed of the slipping motor increases. Accordingly, the relay closes its contact members, thereby energizing the warning lamp 29 which notifies the operator of the locomotive that wheel slippage is occurring. The operator may then reduce the throttle opening for the engine, thereby reducing the power input to the generator to a point where the slipping stops. The voltage impressed on the relay coil then returns to zero and the relay opens its contact members, causing the light to be extinguished. The foregoing operation is repeated if a reoccurrence of the wheel slippage takes place.

From the foregoing description it is apparent that I have provided a slip-indicating scheme which is simple in operation and requires a relatively small amount of equipment. Furthermore, the present scheme is suitable for use with parallel-connected motors. While I have described the scheme as applied to a self-propelled locomotive of the Diesel-electric type, it will be understood that the scheme is applicable to trolley or third-rail locomotives as well as to self-propelled locomotives.

I do not desire to be restricted to the particular form or arrangement of parts herein shown and described, since it is evident that they may be changed and modified without departing from the spirit and scope of my invention as defined in the appended claims.

I claim as my invention:

1. In a control system, in combination, a pair of traction motors, each motor having an armature winding and a series field winding, a generator for supplying power to the motors, said generator having a drooping voltage characteristic, switching means for connecting the motors to the generator in parallel-circuit relation, and a relay having an actuating coil connected between the armature winding and the series field winding of each motor to be responsive to an unbalance in the motor speeds.

2. In a control system, in combination, a pair of traction motors, each motor having an armature winding and a series field winding, a generator for supplying power to the motors, said generator having a drooping voltage characteristic, switching means for connecting the motors to the generator in parallel-circuit relation, a relay having an actuating coil connected between the armature winding and the series field winding of each motor to be responsive to an unbalance in the motor speeds, and an indicating device energized through the contact members of said relay.

3. In a control system, in combination, a pair of traction motors, each motor having an armature winding and a series field winding, a generator for supplying power to the motors, said generator being differentially excited, switching means for connecting the motors to the generator in parallel-circuit relation, and a relay having an actuating coil connected between the armature winding and the series field winding of each motor to be responsive to an unbalance in the motor speeds.

4. In a control system, in combination, a pair of traction motors, each motor having an armature winding and a series field winding, a generator for supplying power to the motors, said generator being differentially excited, switching means for connecting the motors to the generator in parallel-circuit relation, a relay having an actuating coil connected between the armature winding and the series field winding of each motor to be responsive to an unbalance in the motor speeds, and an indicating device energized through the contact members of said relay.

5. In a control system, in combination, a pair of traction motors, each motor having an armature winding and a series field winding, a generator for supplying power to the motors, an exciter for the generator; a differential field for the exciter, said differential field being energized by the generator load current, switching means for connecting the motors to the generator in parallel-circuit relation, and a relay connected between the armature winding and the series field winding of each motor to be responsive to an unbalance in the motor speeds.

6. In a control system, in combination, a pair of traction motors, each motor having an armature winding and a series field winding, a generator for supplying power to the motors, an exciter for the generator, a differential field for the exciter, said differential field being energized by the generator load current, switching means for connecting the motors to the generator in parallel-circuit relation, a relay connected between the armature winding and the series field winding of each motor to be responsive to an unbalance in the motor speeds, and indicating means energized as a result of the operation of said relay.

THELBERT L. WEYBREW.